(12) United States Patent
Sekitsuka et al.

(10) Patent No.: US 10,890,666 B2
(45) Date of Patent: Jan. 12, 2021

(54) SATELLITE RADIOWAVE RECEIVING DEVICE, ELECTRONIC TIMEPIECE, CONTROL METHOD FOR OBTAINING POSITIONING INFORMATION, AND RECORDING MEDIUM

(71) Applicant: CASIO COMPUTER CO., LTD., Tokyo (JP)

(72) Inventors: Tatsuya Sekitsuka, Kunitachi (JP); Takeshi Matsue, Kokubunji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 183 days.

(21) Appl. No.: 16/135,229

(22) Filed: Sep. 19, 2018

(65) Prior Publication Data

US 2019/0094382 A1   Mar. 28, 2019

(30) Foreign Application Priority Data

Sep. 25, 2017 (JP) ................................ 2017-183259

(51) Int. Cl.
| | | |
|---|---|---|
| G01S 19/32 | (2010.01) | |
| G04G 5/00 | (2013.01) | |
| G01S 19/31 | (2010.01) | |
| G04R 20/04 | (2013.01) | |

(52) U.S. Cl.
CPC ............. *G01S 19/32* (2013.01); *G01S 19/31* (2013.01); *G04G 5/002* (2013.01); *G04R 20/04* (2013.01)

(58) Field of Classification Search
CPC ......... G01S 19/32; G01S 19/31; G01S 19/48; G01S 19/14; G01S 19/49; G01S 5/0263; G04G 5/002; G04R 20/04

USPC ...................................................... 342/357.71
See application file for complete search history.

(56) References Cited

U.S. PATENT DOCUMENTS

| | | | | |
|---|---|---|---|---|
| 6,212,133 B1* | 4/2001 | McCoy | ................... | G01S 19/34 342/357.43 |
| 2006/0036365 A1* | 2/2006 | Chiayee | ................ | G01S 19/258 701/469 |

FOREIGN PATENT DOCUMENTS

| | | |
|---|---|---|
| JP | 2011-149925 A | 8/2011 |
| JP | 2016-048246 A | 4/2016 |

* cited by examiner

*Primary Examiner* — Harry K Liu
(74) *Attorney, Agent, or Firm* — Scully Scott Murphy & Presser (57) ABSTRACT

A satellite radiowave receiving device includes a receiver performing a receiving operation of radiowaves transmitted from a positioning satellite and a processor controlling a positioning operation. The processor performs the positioning operation within at least a predetermined maximum positioning interval from a last positioning operation using preliminarily obtained date and time information and valid positional information on the positioning satellite to obtain a current position of the satellite radiowave receiving device and date and time information. The processor causes the receiver to perform the receiving operation within at least a predetermined date and time updating interval shorter than the predetermined maximum positioning interval from a last time when date and time information is obtained from radiowaves transmitted from a positioning satellite to obtain date and time information without the positioning operation.

12 Claims, 4 Drawing Sheets

SATELLITE RADIOWAVE RECEIVING DEVICE, ELECTRONIC TIMEPIECE, CONTROL METHOD FOR OBTAINING POSITIONING INFORMATION, AND RECORDING MEDIUM

BACKGROUND

The present invention relates to a satellite radiowave receiving device, an electronic timepiece, a control method for obtaining positioning information, and a recording medium.

A satellite radiowave receiving device (positioning device) receives radiowaves from positioning satellites and calculates the positioning to identify the current position of the device. The radiowaves of each positioning satellite are transmitted with the positional information on the positioning satellite and the transmission date and time of radiowaves. The satellite radiowave receiving device obtains such information from a plurality of positioning satellites to calculate its current position based on the positions of these positioning satellites and differences in timing to receive radiowaves.

At the start of a positioning operation, it takes time to acquire radiowaves from a required number of positioning satellites and obtain the positional information on these positioning satellites and their transmission date and time information. To reduce the Time to First Fix (TTFF), i.e., the time to determine an initial position, there have been known a technique to obtain and retain information on positioning satellites and their positional information, including orbit information (ephemeris) which can be acquired from other satellite radiowave receiving devices by ground communications (Japanese Unexamined Patent Application Publication No. 2016-48246).

However, despite the retained positional information on the positioning satellites, an inaccurate date and time counted by the satellite radiowave receiving device results in obtaining an inaccurate position of each positioning satellite at the date and time, and eventually in an inadequate reduction in time to determine the accurate position of the satellite radiowave receiving device in positioning calculations.

The present invention discloses a satellite radiowave receiving device, an electronic timepiece, a control method for obtaining positioning information, and a recording medium.

To achieve at least one of the abovementioned objects, according to an aspect of the present invention, a satellite radiowave receiving device includes:

a receiver performing a receiving operation of radiowaves transmitted from a positioning satellite; and a processor controlling a positioning operation, wherein the processor performs the positioning operation within at least a predetermined maximum positioning interval from a last positioning operation using preliminarily obtained date and time information and valid positional information on the positioning satellite to obtain a current position of the satellite radiowave receiving device and date and time information, and wherein the processor causes the receiver to perform the receiving operation within at least a predetermined date and time updating interval shorter than the predetermined maximum positioning interval from a last time when date and time information is obtained from radiowaves transmitted from a positioning satellite to obtain date and time information without the positioning operation.

DETAILED DESCRIPTION

An embodiment will now be described with reference to the drawings.

Figure 1:
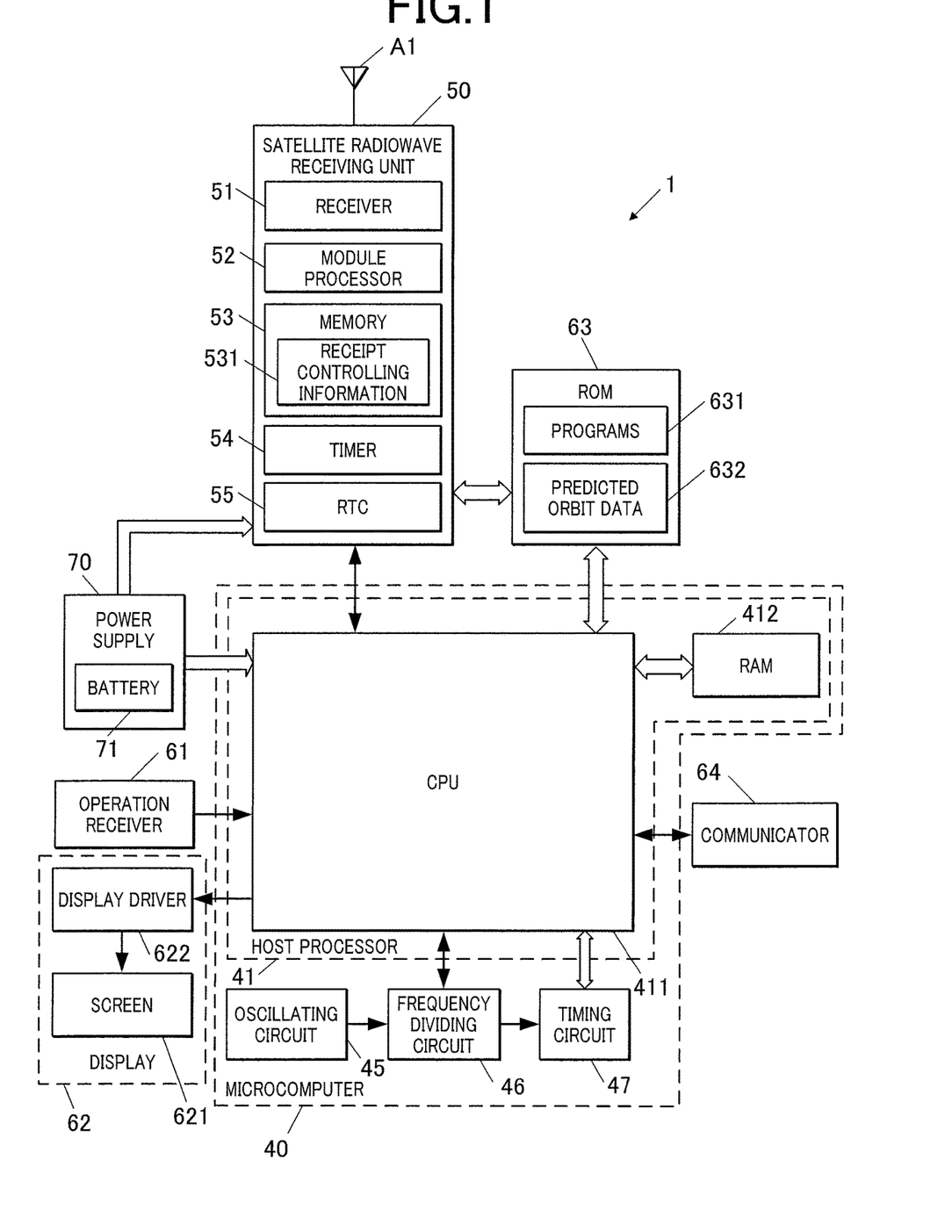
FIG. 1 is a block diagram illustrating a functional configuration of an electronic timepiece according to one embodiment of the present invention.

FIG. 1 is a block diagram illustrating a functional configuration of an electronic timepiece 1 according to one embodiment of the present invention.

An electronic timepiece 1 may be any portable timepiece, for example, a wristwatch, though not limited. The electronic timepiece 1 includes a microcomputer 40, a satellite radiowave receiving unit 50, an antenna A1, an operation receiver 61, a display 62, a read only memory (ROM) 63 (a memory that can be included in the satellite radiowave receiving device according to this embodiment), a communicator 64, and a power supply 70.

The microcomputer 40 performs various operations, such as control of the electronic timepiece 1, storage in memory, and counting of date and time. The microcomputer 40 includes a host processor 41, an oscillating circuit 45, a frequency dividing circuit 46, and a timing circuit 47.

The host processor 41 administers the overall operations of the electronic timepiece 1. The host processor 41 includes a central processing unit (CPU) 411 and a random access memory (RAM) 412.

The CPU 411 performs various calculations to control a normal display of date and time and operations relevant to the various functions of the electronic timepiece 1, such as alarm notification, timer, and stop watch functions. The CPU 411 also controls display and notification of the results of a positioning operation or a date and time obtaining operation performed by the satellite radiowave receiving unit 50.

The RAM 412 provides the CPU 411 with a working memory and temporarily stores data. The temporary data includes information on time zone settings and local time settings (including daylight-saving time). The time zone settings are used to display the current date and time (local time) at a set position, such as the current position, in a region in the world. These local time settings may be updated in accordance with obtained current position information. The RAM 412 may be external to the microcomputer 40. The RAM 412 may also include a rewritable non-volatile memory in addition to DRAM.

The RAM 412 also stores the settings of an external device to be a communication partner of the communicator 64 (pairing settings).

The oscillating circuit 45 generates and outputs a signal with a predetermined frequency of, for example, 32.768 kHz (clock signal). A crystal oscillator, for example, is used to generate clock signals. The crystal oscillator may be external to the microcomputer 40. The frequency of the clock signals output from the oscillating circuit 45 may contain offset errors within an allowable range determined for the electronic timepiece 1. The frequency of the clock signals varies, depending on a surrounding environment, primarily temperatures.

The frequency dividing circuit 46 frequency-divides the clock signals input from the oscillating circuit 45 into frequency-division signals with a predetermined frequency division ratio, and outputs the frequency-division signals. The frequency division ratio may be varied by the CPU 411.

The timing circuit 47 counts signals with a predetermined frequency input from the frequency dividing circuit 46, which may be identical to that of the clock signals, to obtain and retain the current date and time. The accuracy of the date and time obtained by the timing circuit 47 depends on the accuracy of the clock signals from the oscillating circuit 45, i.e., the above-mentioned offset errors and the degree of variations in the frequency of the clock signals. The date and time obtained by the timing circuit 47 may include errors from an accurate date and time. The CPU 411 can modify the counted date and time based on the current date and time obtained by the satellite radiowave receiving unit 50.

The satellite radiowave receiving unit 50 can receive radiowaves transmitted from a positioning satellite in a global navigation satellite system (GLASS), such as Global Positioning System (GPS) of the U.S.A. The satellite radiowave receiving unit 50 processes the received radiowaves to obtain information on the current date and time and the current position. In response to a request of the host processor 41 (CPU 411), the satellite radiowave receiving unit 50 outputs requested information in a predetermined format to the host processor 41. The satellite radiowave receiving unit 50 includes a receiver 51, a module processor 52 (a computer equipped with a processor and the receiver 51), a memory 53, a timer 54, and a real-time clock (RTC) 55.

The receiver 51 receives radiowaves transmitted from a target positioning satellite. In the receiving operation, the receiver 51 acquires (or detects) the radiowaves transmitted from the positioning satellite and identifies the positioning satellite and the phase of signals in the transmitted radiowaves (a navigation message). The receiver 51 tracks the radiowaves transmitted from the positioning satellite based on the acquired identification information of the positioning satellite and the phase and continuously demodulate and obtain the signals.

The module processor 52 includes a CPU and a RAM and controls the various operations of the satellite radiowave receiving unit 50, including positioning operations. In response to an instruction of the host processor 41, the module processor 52 causes the receiver 51 to receive radiowaves from a positioning satellite at an appropriate timing, obtains necessary information from the received radiowaves, and performs various calculations for positioning to obtain the current date and time (date and time information) and the current position of the electronic timepiece 1 (satellite radiowave receiving device). The module processor 52 may be provided with a dedicated hardware circuit for various calculations. The results of the positioning may be output in a common format, such as NMEA-0183 (National Marine Electronics Association), or in a format specific to the electronic timepiece 1. The data output by the hardware circuit in a predetermined format may be processed as needed and output by the CPU. The RAM is provided in a control chip of the module processor 52. Alternatively, the RAM may be external to the control chip.

The memory 53 stores receipt controlling information 531, such as various setting data and received information, and control programs executed by the module processor 52 in the satellite radiowave receiving unit 50. Examples of the setting data include format data for navigation messages from each positioning satellite. The received information includes, for example, almanac and ephemeris, which are obtained orbit information on each positioning satellite. The memory 53 is a non-volatile memory and may be external to a control chip (a substrate) of the module processor 52.

The timer 54 counts a set time and outputs a control signal to the module processor 52 at the end of the counting operation. The timer 54 can be continuously active while other components of the satellite radiowave receiving unit 50, such as the module processor 52, are inactive, for example, in the sleeping state. In the case where the counting operation is completed while the module processor 52 is inactive, the timer 54 reactivates the module processor 52 and outputs a control signal.

The RTC 55 counts the date and time. Regardless of the operating states of other components in the satellite radiowave receiving unit 50, i.e., even if other components in the satellite radiowave receiving unit 50, such as the module processor 52, are inactive, the RTC 55 is continuously active and outputs the current date and time in response to the activation of any of the other components. The date and time counted by the RTC 55 may deviate from an accurate date and time, depending on the environment, such as an environmental temperature, of the electronic timepiece 1 and the satellite radiowave receiving unit 50. The date and time counted by the RTC 55 can be modified (corrected) under the control of the module processor 52.

The operation receiver 61 receives external input operations, such as a user operation. The operation receiver 61 includes a push-button switch and a winding crown. In response to a pressing operation of the push-button switch or a pulling-out, rotating, or pushing-back operation of the winding crown, the operation receiver 61 outputs a corresponding operational signal to the CPU 411. Alternatively, the operation receiver 61 may include a touch sensor.

The display 62 shows various pieces of information in accordance with the control of the host processor 41. The display 62 includes a display driver 622 and a screen 621. The screen 621 displays digital information on a liquid crystal display (LCD) of a segment, dot-matrix or combination type. Alternatively, the display 62 may be configured to show information with needles and a stepping motor that rotates the needles, instead of the digital display on the display screen 621. In response to a control signal from the CPU 411, the display driver 622 outputs a drive signal on the display screen 621 to show information on the display screen 621. The information appearing on the display 62 includes the date and time information (in particular, the current date and time) obtained from the date and time counted by the timing circuit 47, and date and time settings, set time, and measured time for the alarm notification, timer and stop watch functions. Information on the current position obtained through a positioning operation and local time settings can also be displayed.

The ROM 63 stores programs 631 and initial setting data. The programs 631 are for the host processor 41 and the module processor 52 to perform control operations. The programs 631 include control programs for obtaining the current date and time and positioning operations. The ROM 63 stores a non-volatile memory, such as a rewritable and updatable flash memory, in addition to or in place of a mask ROM. The ROM 63 stores predicted orbit data 632 externally obtained at the communicator 64 as rewritable and updatable data. The ROM 63 is read and write accessible by the host processor 41 and the module processor 52 and detachable from a mount portion, such as a slot.

The predicted orbit data 632 is accurate data that can be used in place of ephemeris, but need not be always identical to the ephemeris. The predicted orbit data 632 may be an ephemeris obtained from another satellite radiowave receiving device or created by a third party irrelevant to a positioning system.

The communicator 64 performs two-way wireless communications with an external device to send and receive desired information. Any type of wireless communications may be used, and Bluetooth (registered trademark) is used in this embodiment. The communicator 64 communicates with an external device based on the pairing setting stored in the RAM 412 under the control of the host processor 41. The communicator 64 externally obtains (or can obtain) at least predicted orbit data 632 under the control of the host processor 41 and updates the ROM 63 with the obtained data.

The power supply 70 supplies power from a battery 71 to various units of the electronic timepiece 1, such as microcomputer 40 and the satellite radiowave receiving unit 50, at a predetermined drive voltage. The supply or non-supply of power to the satellite radiowave receiving unit 50 can be controlled separately from power supply to the microcomputer 40 under the control of the host processor 41. The battery 71 is a replaceable dry-cell battery or a rechargeable battery and may include solar panels and an electricity charging (storing) unit.

The positioning operation of the electronic timepiece 1 according to this embodiment will now be described.

In the positioning calculation, as is known, three components of an unknown current position of the electronic timepiece 1 (satellite radiowave receiving device) in a space coordinate system, and a deviation of date and time counted by the electronic timepiece 1 from an accurate date and time are calculated using differences in the timing to receive radiowaves from four or more positioning satellites (pseudo range), the current positions of the four or more positioning satellites, and the current date and time counted by the electronic timepiece 1 (the RTC 55) (the current position and the current date and time counted by the RTC 55 are collectively referred to as "positioning information"). This calculation is performed by an iterative calculation (successive approximation), for example, the Newton-Raphson method (Newton's method). The iterative calculation involves a numerical convergence of a predetermined initial value to an unknown value.

In the electronic timepiece 1 according to this embodiment, the satellite radiowave receiving unit 50 performs the positioning operation regularly and in response to an instruction received by the satellite radiowave receiving unit 50 from the host processor 41. Such a positioning operation is performed at least once within a predetermined period (a maximum positioning interval), for example, within one hour, from the last positioning operation. Such a positioning operation performed at the minimum frequency is controlled by the satellite radiowave receiving unit 50 using the timer 54.

The current position of a positioning satellite can be obtained from an ephemeris contained in acquired radiowaves transmitted from the positioning satellite. It takes 18 to 48 seconds to obtain the ephemeris. The ephemeris has a valid period that covers the current date and time. Starting a positioning operation while an ephemeris within the valid period is preliminarily retained (hot start) shortens the time to obtain initial results of positioning from the start of a positioning operation by the time to obtain an ephemeris. Even if the current position of the electronic timepiece 1 (satellite radiowave receiving device) is obtained promptly, the satellite radiowave receiving unit 50 continues to receive radiowaves at appropriate intervals (during at least part of a receiving operation in the positioning process) until a new ephemeris is obtained.

In the case where a valid ephemeris is not contained in receipt control information 531, and predicted orbit data 632 which is valid for a period covering the current date and time is retained, the electronic timepiece 1 according to this embodiment can read and use the predicted orbit data 632. The predicted orbit data 632 is obtained from an external device (other than radiowaves transmitted from a positioning satellite) via the communicator 64 regularly or in response to a predetermined input operation accepted by the operation receiver 61. Obtaining regularly the predicted orbit data 632 eliminates the need for a continued receiving operation by the receiver 51 until an ephemeris is obtained through regular receiving operations. In other words, in the electronic timepiece 1, the valid positional information on a positioning satellite (a valid ephemeris and/or valid predicted orbit data 632 in the receipt control information 531) is preliminarily obtained and continuously retained.

Figure 2:
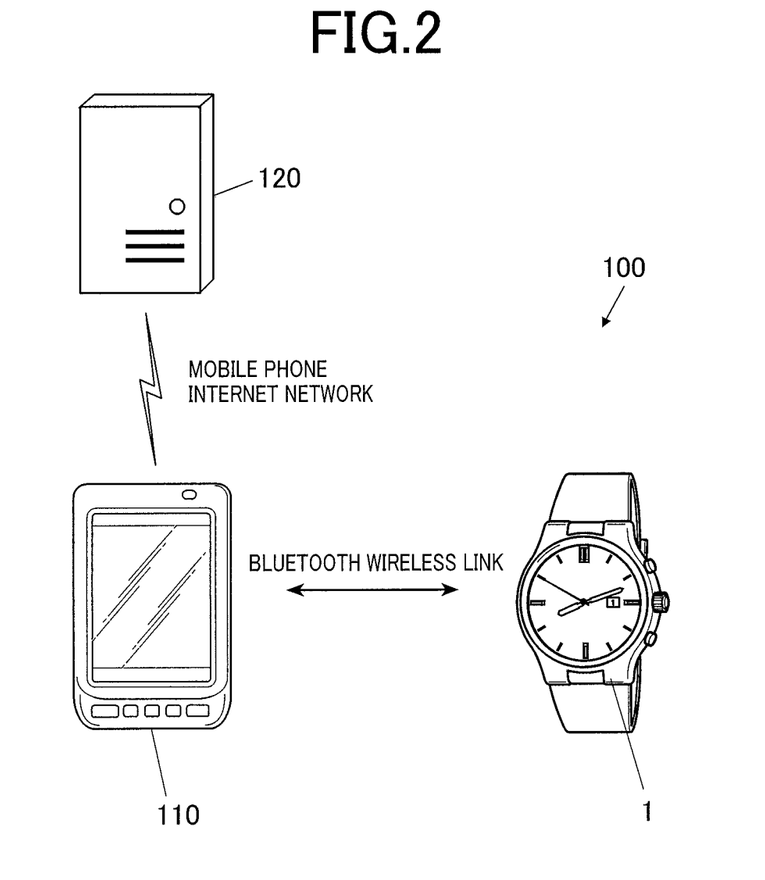
FIG. 2 illustrates a system configuration for obtaining predicted orbit data.

FIG. 2 illustrates a system configuration for obtaining predicted orbit data.

In a system 100, the electronic timepiece 1 can obtain predicted orbit data 632 through a predetermined input operation to the operation receiver 61. A server 120 stores the predicted orbit data 632 and is accessed by an external device 110, a communication partner of the communicator 64 of the electronic timepiece 1. Examples of the external device 110 include smartphones and tablet devices.

The external device 110 may allow a user to specify a period that requires data equivalent to an ephemeris, in which case predicted orbit data for the specified period is obtained from the server 120. Alternatively, the server 120 updates data regularly and the external device 110 may simply obtain the latest data. The electronic timepiece 1 obtains the predicted orbit data obtained and retained in the external device 110 via the communicator 64 under the control of the host processor 41. Alternatively, the electronic timepiece 1 may specify a required period for an ephemeris and send the designated period to the external device 110. The external device 110 may request the server 120 for predicted orbit data for the specified period.

The electronic timepiece 1 according to this embodiment causes the receiver 51 to obtain date and time information from any of the positioning satellites without a positioning operation within a period shorter than the maximum positioning interval (a date and time updating interval) from the last time when date and time information is obtained from radiowaves transmitted from a positioning satellite. The satellite radiowave receiving unit 50 uses date and time counted by the RTC 55 as an initial value for positioning. The date and time counted by the RTC 55 may contain a deviation, as described above. A difference between the current date and time counted by the RTC 55 and an accurate date and time is unknown. Furthermore, the current position of a positioning satellite which is estimated based on the deviation also contains a deviation. An initial value used for the convergence calculation deviating from an accurate value or a greater error in the current position of a positioning satellite used as a known value is likely to extend the convergence time and, what is worse, results in convergence into an inaccurate value or no convergence to an accurate value at all. In this case, keeping orbit information for a positioning satellite does not effectively reduce the time to obtain the current position by a hot start. To keep the current date and time accurate, the electronic timepiece 1 obtains date and time information at date and time updating intervals much shorter than the maximum positioning intervals. This can minimize an error in an initial value of the current date and time obtained through the date and time information (the latest positioning information) and a positional deviation of a positioning satellite at the start of a positioning operation, achieving convergence into an accurate current position within a short time.

In the case where only date and time information is obtained without a positioning operation, the date and time information is obtained from radiowaves transmitted from a single positioning satellite. In this case, a propagation time of radiowaves from the positioning satellite is unknown and in the range of about 65 to 85 msec. Subtraction of, for example, an average value (about 75 msec) from the propagation time can keep the counted date and time within an error range of about ±10 msec from an accurate date and time. In the case where the maximum positioning interval is not so large (for example, travelling at 600 km/h has impact of 2 msec on the propagation time at most), it is unlikely that the position of the electronic timepiece 1 (satellite radiowave receiving device) changes significantly from the position obtained in the last positioning operation. A distance, i.e., a propagation time, may be approximated from the position determined in the last positioning operation and the current position of the positioning satellite. In this case, positioning satellites to be acquired may be preliminarily limited to several positioning satellites having favorable receiving conditions. For example, positioning satellites to be acquired may be limited to those with an angle of elevation of 45° or more. Such a limitation reduces a variation in propagation time and facilitates a reduction in the impact of multipath. Alternatively, various other known techniques may be used to modify date and time obtained based on radiowaves received from a single positioning satellite.

Since an error of about ±10 msec or less is shorter than each sign (20 msec length) of a navigation message in radiowaves transmitted from a positioning satellite, the deviation of date and time can be determined just by determining the timing for bit synchronization. This can significantly reduce the time to determine date and time as compared with reading of a sign sequence in the navigation message.

As described above, an obtained current date and time contains a slight error, which may result in the obtained current date and time having a deviation from an accurate date and time greater than that of the counted date and time. However, it is important that limitation of the range of actual errors can eliminate a range of date and time in which the current date and time fails to converge in the positioning calculation. The range of expected maximum errors in date and time should be controlled such that the expected maximum errors do not adversely affect convergence accuracy and convergence time in the positioning calculation.

Figure 3:
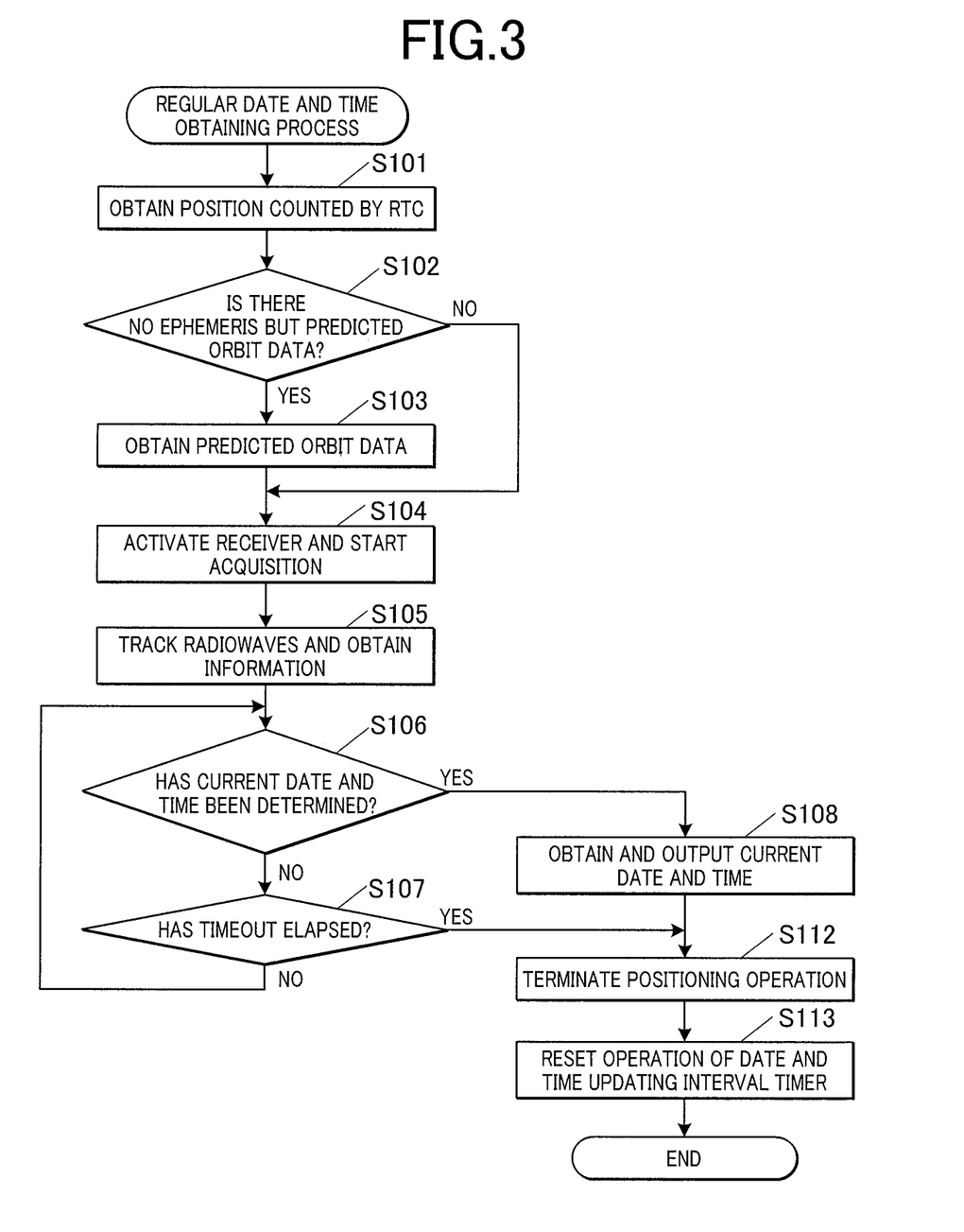
FIG. 3 is a flowchart illustrating a procedure for controlling a regular date and time obtaining process.

FIG. 3 is a flowchart illustrating a procedure performed by the module processor 52 for controlling a regular date and time obtaining process performed at the electronic timepiece 1.

The regular date and time obtaining process starts in response to a control signal sent from the timer 54 when the timer 54 counts a date and time updating interval set in the timer 54 (i.e., when the date and time updating interval elapses after the last time when date and time information is obtained).

After the start of the regular date and time obtaining process, the module processor 52 obtains date and time counted by the RTC 55 (Step S101). The module processor 52 determines whether a valid ephemeris, including the current date and time, is not retained while predicted orbit data 632 is retained (Step S102).

If it is determined that a valid ephemeris is retained or that predicted orbit data 632 is not retained ("NO" at Step S102), the module processor 52 proceeds to Step S104. If it is determined that a valid ephemeris is not retained and that predicted orbit data 632 is retained ("YES" at Step S102), the module processor 52 obtains predicted orbit data 632 (Step S103) and then proceeds to Step S104.

At Step S104, the module processor 52 activates the receiver 51 to start acquiring radiowaves transmitted from a positioning satellite (Step S104). The module processor 52 may limit positioning satellites from which radiowaves are acquired based on the orbit information and the results of the last positioning operation. The module processor 52 tracks the radiowaves transmitted from the acquired positioning satellite to obtain information (Step S105). Tracking radiowaves from a single positioning satellite is enough. However, in the case where radiowaves transmitted from a plurality of positioning satellites are acquired within a short time, radiowaves transmitted from two or more positioning satellites may be tracked.

The module processor 52 determines whether the current date and time has been determined (Step S106). If it is determined that the current date and time has not been determined ("NO" at Step S106), the module processor 52 determines whether a predetermined timeout has elapsed since the start of the receiver 51 (Step S107). If it is determined that the predetermined timeout has not elapsed ("NO" at Step S107), the module processor 52 returns to Step S106. If it is determined that the predetermined timeout has elapsed ("YES" at Step S107), the module processor 52 proceeds to Step S112.

If it is determined that the current date and time is determined at Step S106 ("YES" at Step S106), the module processor 52 obtains the current date and time, modifies the current date and time counted by the RTC 55 with the obtained current date and time, and outputs the modified date and time to the host processor 41 at an appropriate timing (Step S108). The module processor 52 proceeds to Step S112. The module processor 52 need not output the date and time data to the host processor 41 each time the regular date and time obtaining process is performed. After obtaining the date and time data, the host processor 41 can modify date and time counted by the timing circuit 47.

At Step S112, the module processor 52 terminates the positioning operation (Step S112). The module processor 52 causes the receiver 51 to terminate the receiving operation and terminates various processes relevant to tracking of radiowaves and handling of received data.

The module processor 52 causes the timer 54 to stop and re-start counting the date and time updating interval, i.e., the time until the next activation of the regular date and time obtaining process (Step S113). In the case where the termination is performed due to timeout, the module processor 52 may set the counting time of the timer 54 to a value less than the date and time updating interval.

The module processor 52 terminates the regular date and time obtaining process. After the termination, the module processor 52 may terminate the operation (or put itself into a sleep state) if the module processor 52 has no other process to perform.

Figure 4:
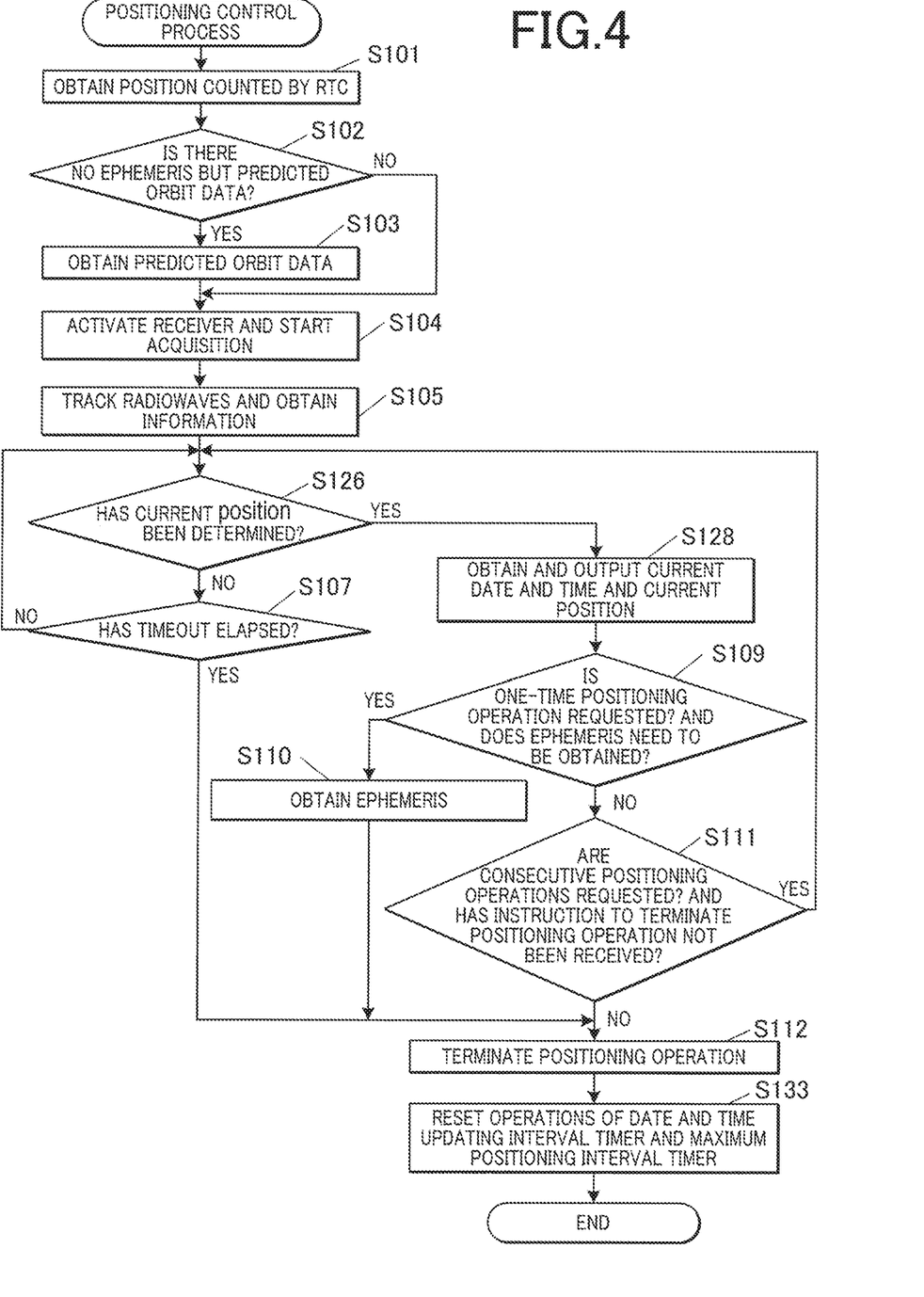
FIG. 4 is a flowchart illustrating a procedure for controlling a positioning process.

FIG. 4 is a flowchart illustrating a procedure performed by the module processor 52 for controlling the positioning process.

The positioning control process starts in response to a control signal from the timer 54 and a positioning command from the host processor 41 when the timer 54 counts a maximum positioning interval set in the timer 54, i.e., the maximum positioning interval from the last positioning operation has elapsed. In response to a predetermined input operation received at the operation receiver 61 or a positioning request from other control program being executed, the host processor 41 outputs a positioning command to the module processor 52. If the satellite radiowave receiving unit 50 is inactive, the host processor 41 activates the satellite radiowave receiving unit 50 before outputting the positioning command.

The positioning control process is identical to the above-mentioned regular date and time obtaining process, except for the addition of the positioning process. More specifically, Steps S109 to S111 are added and Steps S106, S108, and S113 are respectively replaced with Steps S126, S128, and S133. The same steps are given the same reference numerals without redundant explanation.

In response to the start of tracking of acquired radiowaves transmitted from a positioning satellite and obtaining of information at Step S105, the module processor 52 determines whether the current position has been determined (Step S126). If it is determined that the current position has not been obtained ("NO" at Step S126), the module processor 52 proceeds to Step S107.

If it is determined that the current position has been obtained ("YES" at Step S126), the module processor 52 obtains the current position and the current date and time, which is obtained together with the current position, and outputs them to the host processor 41 at an appropriate timing (Step S128). The module processor 52 determines whether the current positioning operation is based on a one-time positioning request and a new ephemeris needs to be obtained (Step S109). If it is determined that the current positioning operation is based on a one-time positioning request and that a new ephemeris needs to be obtained ("YES" at Step S109), the module processor 52 obtains an ephemeris (Step S110). In the case where the current position has been updated during this process, the module processor 52 may re-output the updated position to the host processor 41 and then proceeds to Step S112.

If the current positioning operation is not a one-time positioning operation (but one of the consecutive positioning operations) or if an ephemeris does not need to be obtained ("NO" at Step S109), the module processor 52 determines whether the current positioning request is a request for one of consecutive positioning operations and a command to terminate the positioning operation has not been received from the host processor 41 (Step S111). If it is determined that the current positioning request is a request for consecutive positioning operations and that a command to terminate the positioning operation has not been received ("YES" at Step S111), the module processor 52 returns to Step S126.

If it is determined that the current positioning request is not a request for the consecutive positioning operations (but a request for a one-time positioning operation), or if the command to terminate the consecutive positioning operations has been received ("NO" at Step S111), the module processor 52 proceeds to Step S112.

At Step S133 after Step S112, the module processor 52 resets the both counts of the date and time updating interval used by the timer 54 and the maximum positioning interval (Step S133). The module processor 52 terminates the positioning control process.

In the case where the timer 54 completes counting the date and time updating interval during the positioning control process, the activation of the regular date and time obtaining process in response to a control signal output from the timer 54 to the module processor 52 is cancelled.

The operations at Steps S113 and S133 and the activation of the regular date and time obtaining process in response to an operation of the timer 54 constitute a step for controlling the timing to obtain date and time (means for controlling the timing to obtain date and time) in a control method (program) for obtaining positioning information according to this embodiment.

The operations at Step S133 and the activation of the positioning control process in response to an operation of the timer 54 constitute a step for controlling the positioning timing (means for controlling the positioning timing) in the control method (program) for obtaining positioning information according to this embodiment.

As described above, the satellite radiowave receiving unit 50 according to this embodiment includes the receiver 51 and the module processor 52. The receiver 51 receives radiowaves transmitted from positioning satellites. The module processor 52 controls positioning operations. The module processor 52 uses the current date and time preliminarily obtained and counted by the RTC 55, and the valid positional information on the positioning satellites stored in the memory 53 and/or the ROM 63 to perform a positioning operation within at least the predetermined maximum positioning interval from the last positioning operation and obtain the current position of the satellite radiowave receiving unit 50 (satellite radiowave receiving device) and the current date and time information. The module processor 52 causes the receiver 51 to perform a receiving operation within at least the predetermined date and time updating interval shorter than the maximum positioning interval from the last time when date and time information is obtained from radiowaves transmitted from the positioning satellites to obtain date and time information without positioning.

As described above, the satellite radiowave receiving unit 50, which preliminarily retains the positional information on a positioning satellite, enables a hot start of a positioning operation and obtains date and time information more frequently than a minimum positioning frequency to keep the current date and time counted at a high accuracy. This allows initial parameters used for the positioning calculation to be determined more accurately at the start of a positioning operation to effectively enhance convergence accuracy in the positioning calculation and shorten the convergence time. This can more reliably prevent, in an initial positioning calculation, a failed convergence or an inaccurate convergence for a position or date and time (including where convergence to an accurate position is not achieved or where two or more positioning calculations are required for convergence to an accurate position). The satellite radiowave receiving unit 50 can shorten the time to determine an accurate initial position more reliably. The satellite radiowave receiving unit 50 also can, in particular, in the case where the current position is obtained intermittently, stably maintain positioning accuracy.

In the case where date and time information is obtained without positioning, the module processor 52 obtains date and time information from radiowaves received from a single positioning satellite by the receiver 51. This allows date and time information to be obtained properly within a short time under normal receiving conditions and even under rather unfavorable receiving conditions involving difficulty in receiving radiowaves from a plurality of positioning satellites.

After the elapse of a date and time updating interval from the last time when date and time information is obtained, the module processor 52 causes the receiver 51 to perform a receiving operation to obtain date and time information without positioning. In other words, after the elapse of date and time information obtaining interval without a positioning operation, the module processor 52 automatically causes the receiver 51 to start obtaining date and time information. This keeps the positioning accuracy appropriate through receiving operations of only date and time information at a minimum frequency, without an unnecessary burden on the satellite radiowave receiving unit 50.

The module processor 52 causes the receiver 51 to obtain positional information (ephemeris) of a positioning satellite during a receiving operation performed by the receiver 51 at least in part of a positioning operation. In other words, positioning is performed and a new ephemeris is obtained at an appropriate frequency before the expiration of the valid period of the current ephemeris. This allows the satellite radiowave receiving unit 50 to maintain the positioning accuracy properly with a rapid calculation, without extending the radiowave receiving period more than necessary to update the ephemeris.

The module processor 52 can obtain positional information on a positioning satellite externally, other than from radiowaves transmitted from the positioning satellite. Obtaining positional information externally in such way significantly shortens the time required to obtain an ephemeris, allowing the satellite radiowave receiving unit 50 to continuously obtain a current position at a high accuracy through every radiowave receiving operation and positioning calculation within a short time.

The electronic timepiece 1, which functions as a satellite radiowaves receiving device, includes the communicator 64 that communicates with an external device with Bluetooth. The module processor 52 can receive positional information from an external device via the communicator 64 under the control of the host processor 41. This allows the electronic timepiece 1 to reliably obtain necessary information within a short time using the communicator 64, which not only receives radiowaves and but also performs two-way communications. In particular, the near field communication leads to downsizing of the communicator 64 and a reduction in power consumption. This allows the electronic timepiece 1 to reliably and effectively obtain the current position, while keeping the components of the electronic timepiece 1 compact, to enhance the convenience of the device.

The electronic timepiece 1 according to this embodiment includes the satellite radiowave receiving unit 50, which may include the ROM 63 and the communicator 64, as described above. This ensures that the electronic timepiece can always obtain the results of the first positioning operation reliably within a short time. This can also shorten the time to force the user of the electronic timepiece 1 to stand by or restrict the action during a receiving operation, and show the current position promptly. This can also reduce the risk of a positioning failure due to a variation in the surrounding environment during the traveling of the user, in the electronic timepiece 1.

The control method for obtaining positioning information according to this embodiment includes a step for controlling the positioning timing and a step for controlling the obtaining timing of date and time. The step for controlling the positioning timing involves positioning within at least the predetermined maximum positioning interval from the last positioning operation using the current date and time preliminarily obtained and counted by the RTC 55 and valid positional information on a positioning satellite (ephemeris or the predicted orbit data 632) to obtain the current position of the electronic timepiece 1 (the satellite radiowave receiving unit 50) and the current date and time information. The step for controlling the obtaining timing of date and time involves obtaining date and time information without positioning by causing the receiver 51 to perform a receiving operation within at least the predetermined date and time updating interval shorter than the maximum positioning interval from the last time when date and time information is obtained from radiowaves transmitted from a positioning satellite.

The control method for obtaining positioning information, which preliminarily retains the positional information on a positioning satellite, enables a hot start of the positioning operation and obtains date and time information more frequently than a minimum positioning frequency to keep the current date and time counted at a high accuracy. This allows initial parameters used for the positioning calculation to be determined more accurately at the start of the positioning operation to effectively enhance the convergence accuracy in the positioning calculation (or prevent convergence to an inaccurate date and time or position) and shorten the convergence time. The control method for obtaining positioning information can shorten the time to determine an initial position accurately and more reliably.

The satellite radiowave receiving unit 50 includes the receiver 51 and causes an electronic device capable of performing a positioning operation to install and execute the programs 631 that perform the control method for obtaining positioning information. This allows the electronic device to easily obtain an accurate current position more reliably within a short time. This also allows various electronic devices to obtain the first current position data reliably, without keeping the user wait for a long time.

The present invention should not be limited to the above embodiment and various modifications are available.

For example, in the above embodiment, date and time information is obtained without positioning after the elapse of a date and time updating interval from the last time when date and time information is obtained. However, it is not always after the elapse of a date and time updating interval from the last time when date and time information is obtained that date and time information is obtained without positioning. For example, date and time information may be obtained periodically at the date and time updating intervals, regardless of the positioning operations. If the date and time updating interval in this case is counted before a positioning operation, date and time information is obtained before the elapse of the date and time updating interval from a positioning operation which is the last time when date and time is obtained. Alternatively, the date and time updating interval may be set shorter than the minimum interval required for updating date and time. However, even in this case, if a positioning operation is performed just at the elapse of date and time updating interval, date and time information need not be obtained.

More simply, a positioning operation may be performed every thirty minutes to obtain both the current position and date and time information, and date and time information may be obtained alone without positioning every ten minutes, at a timing not overlapping with the positioning operation.

Date and time information need not be always obtained from radiowaves transmitted from a single positioning satellite. If radiowaves transmitted from a plurality of positioning satellites are acquired substantially concurrently, date and time information may be obtained from radiowaves transmitted from the positioning satellites. Alternatively, date and time information may be always obtained from radiowaves transmitted from two satellites. Alternatively, date and time information determined to be most accurate in consideration of receiving conditions may be selected from several pieces of date and time information obtained from a plurality of positioning satellites.

In the above embodiment, an ephemeris is obtained from radiowaves transmitted from a positioning satellite at an appropriate timing corresponding to an ephemeris update frequency during a positioning operation. Alternatively, an ephemeris is not obtained unless an ephemeris can be obtained through consecutive positioning operations, and externally obtained predicted orbit data may be, in principle, used.

In the above embodiment, the host processor 41 controls the communicator 64 to obtain the predicted orbit data 632, and the module processor 52 reads the predicted orbit data 632 from the ROM 63. Alternatively, the module processor 52 may directly control the communicator 64 to obtain the predicted orbit data 632. In this case, the obtained predicted orbit data may be stored in the memory 53 in the satellite radiowave receiving unit 50.

In the above embodiment, the predicted orbit data is obtained externally in two steps via a smartphone, an electronic device capable of performing the near field communication using Bluetooth. Alternatively, the satellite radiowave receiving unit 50 may directly access the server over a wireless LAN to obtain the predicted orbit data.

In the above embodiment, the satellite radiowave receiving unit 50 in the electronic timepiece 1 is exemplified, though not limitative in any way. The present invention is applicable to a positioning module loaded in an electronic device having a function to perform positioning operations or to an electronic device in general. Radiowaves may be received from any positioning satellites. Radiowaves from positioning satellites in several global positioning systems or those from regional positioning satellites, which supplement the functions of the global positioning systems, may be present at the same time.

In the above description, the programs 631, control programs for obtaining positioning information according to the present invention are stored in a computer-readable recording medium, such as a nonvolatile memory, including a flash memory, and the ROM 63, including a mask ROM, though not limitative in any way. Any other type of computer-readable recording medium may be used, for example, a portable recording medium, such as hard disk drive (HDD), CD-ROM, and DVD disk. The present invention is also applicable to carrier waves, a medium which provides the programs according to the present invention with data via a communication line.

It should be understood that the details of the configurations, control procedures, and display examples shown in the above embodiment can be appropriately modified without departing from the scope of the present invention.

The embodiments described above should not be construed to limit the present invention, and the claims and other equivalents thereof are included in the scope of the invention.

What is claimed is:

1. A satellite radiowave receiving device comprising:
    a receiver for performing a receiving operation of radiowaves transmitted from a plurality of positioning satellites; and
    a processor being configured to:
        determine an elapse of a predetermined positioning time interval from a last positioning operation;
        in response to a determination of the elapse of the predetermined positioning time interval from the last positioning operation, perform a current positioning operation using preliminarily obtained date and time information and valid positional information on the plurality of positioning satellites to obtain a current position of the satellite radiowave receiving device and current date and time information;
        before the elapse of the predetermined positioning time interval from the last positioning operation, determine an elapse of a predetermined date and time updating interval from a last time when date and time information is obtained from radiowaves transmitted from at least one positioning satellite, wherein the predetermined date and time updating time interval is shorter than the predetermined positioning time interval; and
        in response to a determination of the elapse of the predetermined date and time updating time interval from the last time when the date and time information is obtained, cause the receiver to perform the receiving operation to obtain updated date and time information from radiowaves transmitted from a single positioning satellite and received by the receiver, such that the updated date and time information is obtained without a positioning operation.

2. The satellite radiowave receiving device according to claim 1, wherein, after the elapse of the date and time updating interval from the last time when date and time information is obtained, the processor is configured to cause the receiver to perform the receiving operation to obtain date and time information without the positioning operation.

3. The satellite radiowave receiving device according to claim 1, wherein the processor is configured to cause the receiver to obtain the positional information during the receiving operation performed by the receiver at least in part of the positioning operation.

4. The satellite radiowave receiving device according to claim 2, wherein the processor configured to cause the receiver to obtain the positional information during the receiving operation performed by the receiver at least in part of the positioning operation.

5. The satellite radiowave receiving device according to claim 1, wherein the processor is configured to obtain the positional information externally, other than from radiowaves transmitted from a positioning satellite of the plurality of positioning satellites.

6. The satellite radiowave receiving device according to claim 2, wherein the processor is configured to obtain the positional information externally, other than from radiowaves transmitted from a positioning satellite of the plurality of positioning satellites.

7. The satellite radiowave receiving device according to claim 3, wherein the processor is configured to obtain the positional information externally, other than from radiowaves transmitted from a positioning satellite of the plurality of positioning satellites.

8. The satellite radiowave receiving device according to claim 1, further comprising a communicator communicating with an external device, wherein the processor is configured to obtain the positional information from the external device via the communicator.

9. The satellite radiowave receiving device according to claim 2, further comprising a communicator communicating with an external device, wherein the processor is configured to obtain the positional information from the external device via the communicator.

10. An electronic timepiece comprising the satellite radiowave receiving device according to claim 1.

11. A control method for obtaining positioning information using a receiver for performing a receiving operation of radiowaves transmitted from a plurality of positioning satellites, the method comprising:
   determining an elapse of a predetermined positioning time interval from a last positioning operation;
   in response to a determination of the elapse of the predetermined positioning time interval from the last positioning operation, performing a current positioning operation using preliminarily obtained date and time information and valid positional information on the plurality of positioning satellites to obtain a current position of the satellite radiowave receiving device and current date and time information;
   before the elapse of the predetermined positioning time interval from the last positioning operation, determining an elapse of a predetermined date and time updating interval from a last time when date and time information is obtained from radiowaves transmitted from at least one positioning satellite, wherein the predetermined date and time updating time interval is shorter than the predetermined positioning time interval; and
   in response to a determination of the elapse of the predetermined date and time updating time interval from the last time when the date and time information is obtained, causing the receiver to perform the receiving operation to obtain updated date and time information from radiowaves transmitted from a single positioning satellite and received by the receiver, such that the updated date and time information is obtained without a positioning operation.

12. A recording medium containing a program readable from a computer including a receiver for performing a receiving operation of radiowaves transmitted from a plurality of positioning satellites, wherein the program causes the computer to:
   determine an elapse of a predetermined positioning time interval from a last positioning operation;
   in response to a determination of the elapse of the predetermined positioning time interval from the last positioning operation, perform a current positioning operation using preliminarily obtained date and time information and valid positional information on the plurality of positioning satellites to obtain a current position of the satellite radiowave receiving device and current date and time information;
   before the elapse of the predetermined positioning time interval from the last positioning operation, determine an elapse of a predetermined date and time updating interval from a last time when date and time information is obtained from radiowaves transmitted from at least one positioning satellite, wherein the predetermined date and time updating time interval is shorter than the predetermined positioning time interval; and
   in response to a determination of the elapse of the predetermined date and time updating time interval from the last time when the date and time information is obtained, cause the receiver to perform the receiving operation to obtain updated date and time information from radiowaves transmitted from a single positioning satellite and received by the receiver, such that the updated date and time information is obtained without a positioning operation.

* * * * *